United States Patent
Chastain et al.

(10) Patent No.: US 9,729,526 B2
(45) Date of Patent: *Aug. 8, 2017

(54) APPARATUS AND METHOD FOR SECURE DELIVERY OF DATA FROM A COMMUNICATION DEVICE

(71) Applicant: AT&T INTELLECTUAL PROPERTY I, L.P., Atlanta, GA (US)

(72) Inventors: Walter Cooper Chastain, Atlanta, GA (US); Stephen Emille Chin, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,106

(22) Filed: Jan. 3, 2017

(65) Prior Publication Data
US 2017/0118185 A1 Apr. 27, 2017

Related U.S. Application Data

(63) Continuation of application No. 15/205,402, filed on Jul. 8, 2016, now Pat. No. 9,560,025, which is a
(Continued)

(51) Int. Cl.
*H04L 29/06* (2006.01)
*H04L 9/08* (2006.01)

(52) U.S. Cl.
CPC ........ *H04L 63/0478* (2013.01); *H04L 9/0877* (2013.01); *H04L 63/061* (2013.01);
(Continued)

(58) Field of Classification Search
CPC ....... G06F 12/1408; G06F 21/60; H04L 9/14; H04L 63/08
See application file for complete search history.

(56) References Cited

U.S. PATENT DOCUMENTS 5,742,910 A 4/1998 Gallant et al.
5,774,544 A * 6/1998 Lee .................. G06F 11/006
                                                      380/277
(Continued)

FOREIGN PATENT DOCUMENTS

AU  2010315111 A1  6/2012
CA     2823685 A1  2/2012
(Continued)

OTHER PUBLICATIONS

"Over-The-Air Platform Security Review", Mandiant Intelligent Information Security, 6 pgs., Aug. 17, 2010.
(Continued)

*Primary Examiner* — Izunna Okeke
(74) *Attorney, Agent, or Firm* — Guntin & Gust, PLC; Jay H. Anderson

(57) ABSTRACT

A system that incorporates the subject disclosure may perform, for example, providing an upload request to a mobile communication device to cause a secure device processor of the mobile communication device to perform a modification of data according to a data protection key to generate modified data and to perform an encryption of the modified data according to an upload transport key to generate encrypted modified data where the secure device processor is separate from and in communication with a secure element of the mobile communication device, and where the secure element receives master keys from a remote management server and stores the master keys to enable the upload transport key and the data protection key to be generated by the secure element without providing the master keys to the secure device processor. Other embodiments are disclosed.

20 Claims, 9 Drawing Sheets

Related U.S. Application Data continuation of application No. 14/091,679, filed on Nov. 27, 2013, now Pat. No. 9,413,759.

(52) U.S. Cl.
CPC ........ *H04L 63/062* (2013.01); *H04L 63/0869* (2013.01); *H04L 2463/061* (2013.01)

(56) References Cited

U.S. PATENT DOCUMENTS

| | | | |
|---|---|---|---|
| 6,005,942 A | 12/1999 | Chan et al. | |
| 6,014,561 A | 1/2000 | Moelne | |
| 6,151,677 A | 11/2000 | Walter et al. | |
| 6,892,301 B1 | 5/2005 | Hansmann et al. | |
| 6,922,200 B1 | 7/2005 | Marques | |
| 7,165,173 B1 | 1/2007 | Herle | |
| 7,185,362 B2 | 2/2007 | Hawkes et al. | |
| 7,239,704 B1 | 7/2007 | Maillard et al. | |
| 7,257,844 B2 | 8/2007 | Woodward et al. | |
| 7,269,732 B2 | 9/2007 | Kilian-Kehr | |
| 7,382,881 B2 | 6/2008 | Uusitalo et al. | |
| 7,454,233 B2 | 11/2008 | Lu et al. | |
| 7,472,123 B2 | 12/2008 | Hamatsu | |
| 7,480,907 B1 | 1/2009 | Marolia et al. | |
| 7,499,960 B2 | 3/2009 | Dageville et al. | |
| 7,606,560 B2 | 10/2009 | Labrou et al. | |
| 7,715,823 B2 | 5/2010 | Bravo et al. | |
| 7,751,567 B2 | 7/2010 | Quick, Jr. et al. | |
| 7,917,751 B2 | 3/2011 | Keohane et al. | |
| 8,032,756 B2 | 10/2011 | Inami | |
| 8,064,598 B2 | 11/2011 | Vaha-Sipila et al. | |
| 8,098,818 B2 | 1/2012 | Grilli et al. | |
| 8,165,635 B2 | 4/2012 | Khan et al. | |
| 8,166,524 B2 | 4/2012 | Sentinelli | |
| 8,213,612 B2 | 7/2012 | Kaabouch et al. | |
| 8,244,181 B2 | 8/2012 | Shuo | |
| 8,271,025 B2 | 9/2012 | Brisebois et al. | |
| 8,333,321 B2 | 12/2012 | Gressel et al. | |
| 8,346,287 B2 | 1/2013 | King et al. | |
| 8,380,171 B2 | 2/2013 | Link et al. | |
| 8,387,119 B2 | 2/2013 | Patel et al. | |
| 8,391,837 B2 | 3/2013 | Corda | |
| 8,406,758 B2 | 3/2013 | Tagg et al. | |
| 8,417,952 B2 | 4/2013 | Cheng et al. | |
| 8,494,908 B2 | 7/2013 | Herwig et al. | |
| 8,503,376 B2 | 8/2013 | Cha et al. | |
| 8,505,085 B2 | 8/2013 | Logan et al. | |
| 8,510,559 B2 | 8/2013 | Guccione et al. | |
| 8,533,803 B2 | 9/2013 | Cha et al. | |
| 8,738,898 B2 | 5/2014 | Herwono et al. | |
| 8,776,189 B2 | 7/2014 | Jain | |
| 8,799,932 B2 | 8/2014 | Prevost | |
| 8,814,051 B2 | 8/2014 | Millet et al. | |
| 8,837,449 B2 | 9/2014 | Chen et al. | |
| 9,301,145 B2 | 3/2016 | Merrien et al. | |
| 2001/0029581 A1 | 10/2001 | Knauft et al. | |
| 2002/0040936 A1 | 4/2002 | Wentker et al. | |
| 2003/0129965 A1 | 7/2003 | Siegel | |
| 2003/0186722 A1 | 10/2003 | Weiner | |
| 2004/0240671 A1 | 12/2004 | Hu et al. | |
| 2005/0002407 A1 | 1/2005 | Shaheen et al. | |
| 2005/0202803 A1 | 9/2005 | Mahalal | |
| 2005/0278787 A1 | 12/2005 | Naslund et al. | |
| 2006/0079284 A1 | 4/2006 | Lu et al. | |
| 2006/0130128 A1 | 6/2006 | Gorancic et al. | |
| 2006/0165060 A1 | 7/2006 | Dua | |
| 2006/0205387 A1 | 9/2006 | Laitinen et al. | |
| 2006/0206710 A1 | 9/2006 | Gehrmann | |
| 2006/0242064 A1 | 10/2006 | Jogand-Coulomb et al. | |
| 2006/0269061 A1 | 11/2006 | Balasubramanian et al. | |
| 2006/0289659 A1 | 12/2006 | Mizushima et al. | |
| 2007/0050365 A1 | 3/2007 | Laitinen et al. | |
| 2007/0101122 A1 | 5/2007 | Guo | |
| 2007/0239857 A1 | 10/2007 | Mahalal et al. | |
| 2007/0294744 A1 | 12/2007 | Alessio et al. | |
| 2008/0005559 A1 | 1/2008 | Johnson | |
| 2008/0010470 A1 | 1/2008 | McKeon et al. | |
| 2008/0155257 A1* | 6/2008 | Werner | H04L 9/3226 713/168 |
| 2008/0301433 A1 | 12/2008 | Vito | |
| 2008/0304458 A1 | 12/2008 | Aghvami et al. | |
| 2009/0077643 A1 | 3/2009 | Schmidt et al. | |
| 2009/0116642 A1 | 5/2009 | Yang | |
| 2009/0163235 A1 | 6/2009 | Michaels et al. | |
| 2009/0191857 A1 | 7/2009 | Horn et al. | |
| 2009/0220091 A1 | 9/2009 | Howard | |
| 2009/0288012 A1 | 11/2009 | Hertel et al. | |
| 2009/0327138 A1 | 12/2009 | Mardani et al. | |
| 2010/0037230 A1 | 2/2010 | Potonniee et al. | |
| 2010/0048169 A1 | 2/2010 | Yan et al. | |
| 2010/0062808 A1 | 3/2010 | Cha et al. | |
| 2010/0281251 A1 | 11/2010 | Arauz Rosado | |
| 2010/0299731 A1 | 11/2010 | Atkinson | |
| 2010/0306531 A1 | 12/2010 | Nahari | |
| 2010/0315346 A1 | 12/2010 | Lindroos et al. | |
| 2011/0007899 A1 | 1/2011 | Park et al. | |
| 2011/0035584 A1 | 2/2011 | Meyerstein et al. | |
| 2011/0191597 A1 | 8/2011 | Grall et al. | |
| 2011/0208600 A1 | 8/2011 | Aharoni et al. | |
| 2011/0211699 A1 | 9/2011 | Ma et al. | |
| 2011/0265159 A1 | 10/2011 | Ronda et al. | |
| 2011/0296182 A1 | 12/2011 | Jia et al. | |
| 2011/0302017 A1 | 12/2011 | Marti et al. | |
| 2011/0302408 A1 | 12/2011 | McDermott et al. | |
| 2012/0027209 A1 | 2/2012 | Aissi et al. | |
| 2012/0028609 A1 | 2/2012 | Hruska | |
| 2012/0036042 A1 | 2/2012 | Graylin et al. | |
| 2012/0047563 A1 | 2/2012 | Wheeler et al. | |
| 2012/0072979 A1 | 3/2012 | Cha et al. | |
| 2012/0108205 A1 | 5/2012 | Schell et al. | |
| 2012/0108213 A1 | 5/2012 | Kasargod et al. | |
| 2012/0130838 A1 | 5/2012 | Koh et al. | |
| 2012/0142332 A1 | 6/2012 | Li | |
| 2012/0144201 A1 | 6/2012 | Anantha et al. | |
| 2012/0159163 A1 | 6/2012 | von Behren et al. | |
| 2012/0172089 A1 | 7/2012 | Bae et al. | |
| 2012/0185661 A1 | 7/2012 | Desai et al. | |
| 2012/0187184 A1 | 7/2012 | Challa et al. | |
| 2012/0190354 A1 | 7/2012 | Merrien et al. | |
| 2012/0208597 A1 | 8/2012 | Billman | |
| 2012/0233685 A1 | 9/2012 | Palanigounder et al. | |
| 2012/0246476 A1 | 9/2012 | Zhuang et al. | |
| 2012/0259849 A1 | 10/2012 | Deodhar et al. | |
| 2012/0266220 A1 | 10/2012 | Brudnicki et al. | |
| 2012/0311563 A1 | 12/2012 | Lee et al. | |
| 2012/0317261 A1 | 12/2012 | Ahmavaara et al. | |
| 2013/0012168 A1 | 1/2013 | Rajadurai et al. | |
| 2013/0023235 A1 | 1/2013 | Fan et al. | |
| 2013/0024383 A1* | 1/2013 | Kannappan | G06Q 20/40 705/71 |
| 2013/0041830 A1 | 2/2013 | Singh et al. | |
| 2013/0067232 A1 | 3/2013 | Cheung et al. | |
| 2013/0074163 A1 | 3/2013 | Murakami et al. | |
| 2013/0145455 A1 | 6/2013 | Vijayshankar et al. | |
| 2013/0152208 A1 | 6/2013 | King et al. | |
| 2013/0166595 A1 | 6/2013 | Meketa et al. | |
| 2013/0173759 A1 | 7/2013 | Herse et al. | |
| 2013/0203465 A1 | 8/2013 | Ali et al. | |
| 2013/0262317 A1 | 10/2013 | Collinge et al. | |
| 2013/0272714 A1 | 10/2013 | Ohkubo | |
| 2013/0291084 A1 | 10/2013 | Amiel et al. | |
| 2013/0329683 A1 | 12/2013 | Gachon et al. | |
| 2013/0344857 A1 | 12/2013 | Berionne et al. | |
| 2014/0013406 A1 | 1/2014 | Tremlet et al. | |
| 2014/0018041 A1 | 1/2014 | Summerer et al. | |
| 2014/0045462 A1* | 2/2014 | Warnez | G06Q 20/3563 455/411 |
| 2014/0057680 A1 | 2/2014 | Proust et al. | |
| 2014/0066019 A1 | 3/2014 | Waters et al. | |
| 2014/0189880 A1 | 7/2014 | Funk et al. | |
| 2014/0215589 A1 | 7/2014 | Dietrich et al. | |
| 2014/0243022 A1 | 8/2014 | L'Heriteau et al. | |
| 2014/0337234 A1 | 11/2014 | Brewer et al. | |
| 2014/0373117 A1 | 12/2014 | Le Saint | |

(56) References Cited

U.S. PATENT DOCUMENTS

| | | | |
|---|---|---|---|
| 2015/0017910 A1* | 1/2015 | Li | H04B 5/0056 455/41.1 |
| 2016/0006762 A1 | 1/2016 | Dumoulin et al. | |
| 2016/0182512 A1 | 6/2016 | Chastain et al. | |
| 2016/0323111 A1 | 11/2016 | Chastain et al. | |
| 2016/0323255 A1 | 11/2016 | Chastain et al. | |
| 2016/0381555 A1 | 12/2016 | Chastain | |

FOREIGN PATENT DOCUMENTS

| | | |
|---|---|---|
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2113856 A1 | 11/2009 |
| EP | 2223252 A1 | 9/2010 |
| KR | 2013027097 | 3/2013 |
| WO | 2002063517 | 8/2002 |
| WO | 03046719 A2 | 6/2003 |
| WO | WO03046719 | 6/2003 |
| WO | 2007079636 A1 | 7/2007 |
| WO | WO2007079636 | 7/2007 |
| WO | 2008059353 A1 | 5/2008 |
| WO | 200814919 A1 | 12/2008 |
| WO | WO2009/046400 | 4/2009 |
| WO | WO2010051715 | 5/2010 |
| WO | WO2011/115407 | 9/2011 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013/050296 | 11/2013 |

OTHER PUBLICATIONS

"The OTA Platform in the World of LTE", 14 pgs., Jan. 2011.

"3rd Generation Partnership Project; Technical Specification Group Core Network and Terminals; Characteristics of the Universal Subscriber Identity Module (USIM) application", Release 11, 2012.

"3rd Generation Partnership Project; Technical Specification Group Core Network and Terminals; Remote APDU Structure for (U)SIM Toolkit applications", Release 10, 2012.

"3rd Generation Partnership Project; Technical Specification Group Core Network and Terminals; Secured packet structure for (Universal) Subscriber Identity Module (U)SIM Toolkit applications", Release 10, 2012.

"3rd Generation Partnership Project; Technical Specification Group Core Network and Terminals; UICC-terminal interface; Physical and logical characteristics", Release 10, 2011.

"3rd Generation Partnership Project; Technical Specification Group Core Network and Terminals; Universal Subscriber Identity Module (USIM) Application Toolkit (USAT)", Release 11, 2012.

"GlobalPlatform Card Confidential Card Content Management Card Specification v2.2—Amendment A", 2011.

"GlobalPlatform Card Contactless Services Card Specification v2.2—Amendment C", 2012.

"GlobalPlatform Card Remote Application Management over HTTP Card Specification v2.2—Amendment B", 2012.

"GlobalPlatform Card Security Upgrade for Card Content Management Card Specification v 2.2—Amendment E", 2011.

"GlobalPlatform Card Specification", Version 2.2.1, 2011.

"GlobalPlatform Card Technology Secure Channel Protocol 03 Card Specification v 2.2—Amendment D", 2009.

"GlobalPlatform Device Secure Element Remote Application Management", May 2011.

"GlobalPlatform Device Technology Secure Element Access Control", Version 1.0, May 2012.

"GlobalPlatform Device Technology TEE System Architecture", Dec. 2011.

"GlobalPlatform Key Management System", Functional Requirements, Nov. 2003.

"GlobalPlatform System Messaging Specification for Management of Mobile-NFC Services", Feb. 2011.

"Reprogrammable SIMs: Technology, Evolution and Implications", csmg, Sep. 25, 2012.

"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23.

"Smart Cards; Card Application Tookit (CAT)", Release 11, 2012.

"Smart Cards; ETSI numbering system for telecommunication application providers", Release 11, 2011.

"Smart Cards; Machine to Machine UICC; Physical and logical characteristics", Release 9, 2011.

"Smart Cards; Remote APDU structure for UICC based applications", Release 11, 2012.

"Smart Cards; Secured packet structure for UICC based applications", Release 11, 2012.

"Smart Cards; Security mechanisms for UICC based Applications—Functional requirements", Release 8, 2008.

"Smart Cards; UICC Application Programming Interface (UICC API) for Java Card™", Release 9, 2012.

"Smart Cards; UICC—Terminal Interface; Physical and logical characteristics", Release 10, 2011, 179 pages.

"Universal Mobile Telecommunications System (UMTS); UICC-terminal interface; Physical and logical characteristics", Release 10, 2011.

Chen, "An efficient end-to-end security mechanism for IP multimedia subsystem", Computer Communications, 2008, vol. 31.18, pp. 4259-4268.

Dodson, Ben et al., "Snap2Pass: Consumer-Friendly Challenge-Response Authentication with a Phone", http://prpl.stanford.edu/papers/soups10j.pdf, Apr. 30, 2010.

Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.

Global Platform, "Secure Element Remote Application Management", Version 1.0, May 2011.

Imhontu, et al., "A survey on near field communication in mobile phones & PDAs", Dissertation Halmstad University, 2010. http://hh.diva-portal.org/smash/get/diva2:385433/FULLTEXT01.

Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.

Kounelis, Ioannis et al., "Secure Middleware for Mobile Phones and UICC Applications", Mobile Wireless Middleware, Operating Systems, and Applications, Springer Berlin Heidelberg, 2012, 143-152.

Kounelis, Ioannis et al., "Security of service requests for cloud based m-commerce", MIPRO, 2012 Proceedings of the 35th International Convention, IEEE, 2012.

Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p214-225, Jun. 3-5, 2009.

Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.

Zhang, et al., "Cryptographic Key Agreement Protocol Simulation", Semantics Knowledge and Grid (SKG), 2010 Sixth International Conference on, 2010, pp. 418, 419.

* cited by examiner

200

600

APPARATUS AND METHOD FOR SECURE DELIVERY OF DATA FROM A COMMUNICATION DEVICE

CROSS-REFERENCE TO RELATED APPLICATIONS

This application is a continuation of U.S. application Ser. No. 15/205,402, filed Jul. 8, 2016, which is a continuation of U.S. application Ser. No. 14/091,679, filed Nov. 27, 2013 (now U.S. Pat. No. 9,413,759), which are incorporated herein by reference in their entirety.

FIELD OF THE DISCLOSURE

The subject disclosure relates to an apparatus and method for secure delivery of data from a communication device.

BACKGROUND

Electronic devices are being utilized with more frequency to store data and distribute the data to other devices. The data can often be private or confidential, and users desire to have confidence that any data that they are providing to another device is being done securely to avoid unauthorized users from accessing the data.

BRIEF DESCRIPTION OF THE DRAWINGS

Reference will now be made to the accompanying drawings, which are not necessarily drawn to scale, and wherein.

DETAILED DESCRIPTION

Figure 1:
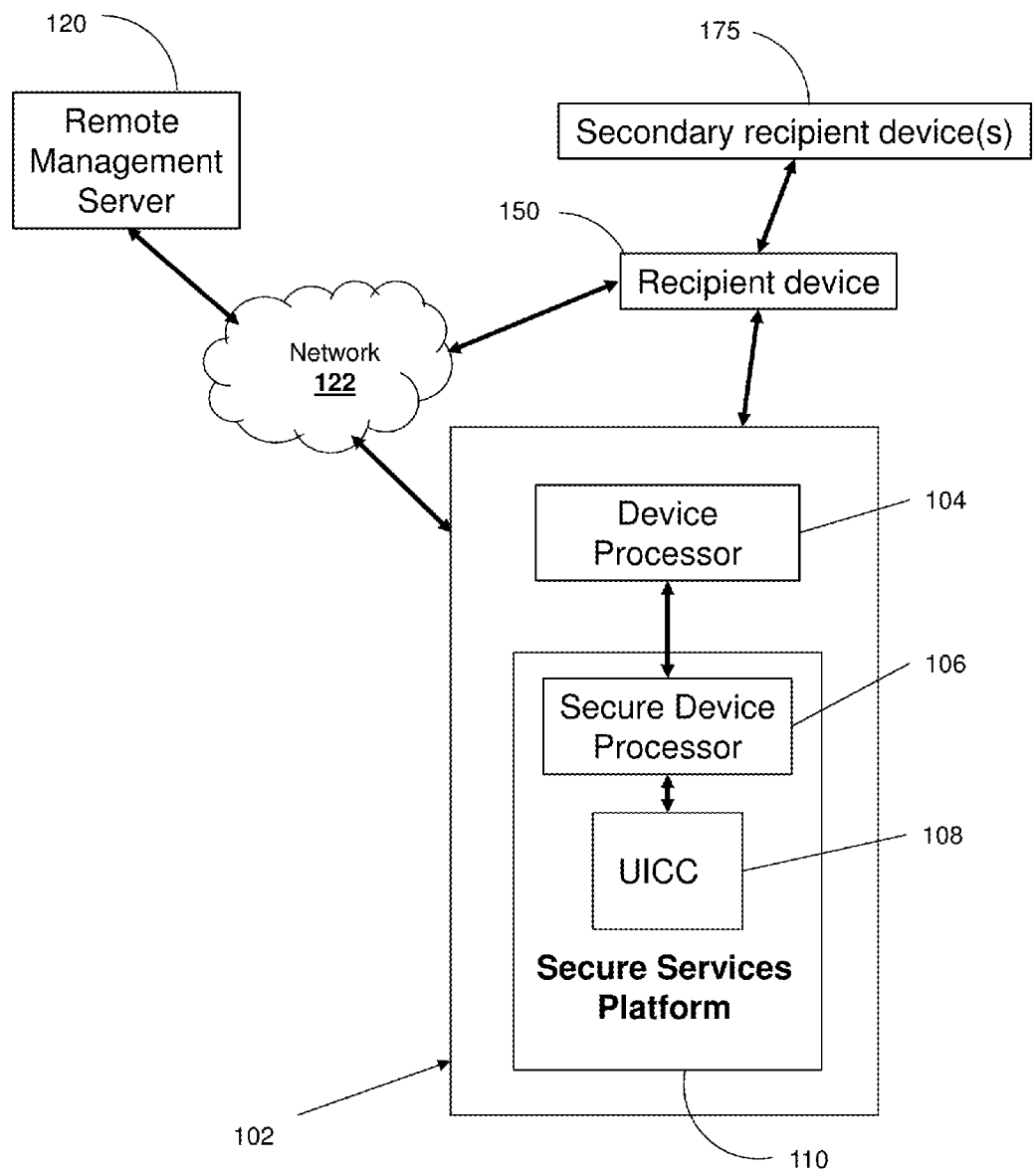
FIG. 1 depicts an illustrative embodiment of a system that enables use of a UICC and a secure device processor as part of a secure services platform for a secure provisioning of a communication device.

The subject disclosure describes, among other things, illustrative embodiments in which a secure element and a secure device processor of a mobile communication device can be utilized together to enable a secure upload or delivery of data from the mobile communication device to another device, such as an application (function) server, another end user device, a removable memory device, and so forth.

In one or more embodiments, master keys can be distributed to the secure element, such as from a remote management server utilizing a mutual authentication process, so that the secure element can store the master keys without providing the master keys to the secure device processor. In one or more embodiments, the secure element can derive other keys, such as an upload transport key and/or a data protection key (from corresponding ones of the master keys), which are each part of keysets that enable encryption and then decryption by different devices, such as an encryption by the secure device processor of the mobile communication device and a decryption by the application server (or other recipient device). In one or more embodiments, a synchronization process can be utilized so that the derived keys of each keyset (e.g., a paired keyset of upload transport keys and/or a paired keyset of data protection keys) are the same to enable encryption and subsequent decryption and/or data modification and subsequent data un-modification by different devices.

In one or more embodiments, the secure device processor can receive the upload transport key and the data protection key from the secure element without receiving the master keys and can apply these keys to the data for modification and/or encryption of the data. For instance, the data protection key can be utilized by the secure device processor for modifying the original data (e.g., data stored by the secure device processor or data stored in another memory of the mobile communication device). This modification can include adding additional information to the data (e.g., permission, authentication data, a time stamp, and so forth) and/or applying an encryption to the data. The upload transport key can then be utilized by the secure device processor for applying an encryption to the already modified data. In one or more embodiments, each of the upload transport key and the data protection key can be utilized for separate encryptions resulting in a double encrypted data.

In one or more embodiments, the recipient device (the device receiving the modified and encrypted data) can have only the upload transport key or can have both the upload transport key and the data protection key. For instance, a recipient device may have only the upload transport key so that the recipient device can decrypt the encrypted modified data into modified data and can store the modified data without having the ability to un-modify the data. In another example, the recipient device can have both of the data protection key and the upload transport key so that both keys are applied to the encrypted modified data to provide access to the original data.

In one or more embodiments, the secure element (e.g., executing a secure upload management function), the secure device processor (e.g., executing a secure upload engine) and/or a device processor can be separate but in communication with each other. The secure element (e.g., a Universal Integrated Circuit Card (UICC)) can be a highly secure computing platform for storing secrets such as encryption keys and authentication credentials, and can host and execute applets. The secure device processor can be a processor that is logically and/or physically separate from the device processor (and/or the secure element), and can offer more security than the device processor, but not as much security as the secure element. Examples of a secure device processor can include a Trusted Execution Environment (TEE) and an embedded Secure Element (eSE). In one or more embodiments, the secure upload engine of the secure device processor in conjunction with a recipient device having a corresponding upload transport key and/or a corresponding data protection key can provide a secure means for controlling the distribution and delivery of data.

Other embodiments are included in the subject disclosure.

One embodiment of the subject disclosure is a computer-readable storage device having executable instructions which, responsive to being executed by a secure device processor of a mobile communication device, cause the secure device processor to perform operations that include requesting an upload transport key and a data protection key from a secure element of the mobile communication device, where the secure device processor is separate from the secure element and in communication with the secure element, and where the secure element stores master keys from which the upload transport key and the data protection key are generated by the secure element. The operations can include receiving the upload transport key and the data protection key without receiving the master keys. The operations can include obtaining data for transmission to a recipient device. The operations can include encrypting the data using the data protection key to generate a single encrypted data. The operations can include encrypting the single encrypted data using the upload transport key to generate a double encrypted data.

One embodiment of the subject disclosure is a method that includes providing, by a server including a processor, an upload request to a mobile communication device to cause a secure device processor of the mobile communication device to perform a first encryption of data according to a data protection key to generate a single encrypted data and to perform a second encryption of the single encrypted data according to an upload transport key to generate a double encrypted data. The secure device processor can be separate from and in communication with a secure element of the mobile communication device. The secure element can receive master keys from a remote management server and can store the master keys to enable the upload transport key and the data protection key to be generated by the secure element without providing the master keys to the secure device processor. The method can include receiving, by the server from the secure device processor, the double encrypted data. The method can include obtaining, by the server, a corresponding upload transport key. The method can include decrypting, by the server, the double encrypted data utilizing the corresponding upload transport key to obtain the single encrypted data. The method can include storing, by the server, the single encrypted data in a memory accessible to the server.

One embodiment of the subject disclosure is a communication device that includes a secure element having a secure element memory that stores first executable instructions that, when executed by the secure element, facilitate performance of first operations. The first operations can include receiving master keys from a remote management server, storing the master keys in the secure element memory, and generating an upload transport key and a data protection key from the master keys. The communication device can also include a secure device processor having a secure device processor memory that stores second executable instructions that, when executed by the secure device processor, facilitate performance of second operations. The second operations can include receiving the upload transport key and the data protection key from the secure element without receiving the master keys. The second operations can include obtaining data for transmission to a recipient device, modifying the data using the data protection key to generate a modified data, and encrypting the modified data using the upload transport key to generate an encrypted modified data. The secure device processor can be separate from the secure element and in communication with the secure element.

In accordance with an embodiment of the disclosure, FIG. 1 depicts a system 100 that includes a communication device 102 connected to or otherwise in communication with a network 122 and provided with a secure services platform 110 enabling secure delivery of data from the communication device 102 to a recipient device (e.g., recipient device 150 and/or secondary recipient device 175).

Device 102 can be loaded with a secure upload engine (e.g., loaded into a Secure Device Processor (SDP) 106) and/or a secure upload management function (e.g., loaded into a secure element 108) to enable or otherwise facilitate secure delivery of data from the communication device 102 to the recipient device, such as an application server, another end user device, a removable memory device, and so forth.

It will be appreciated that the communication device 102 may be any device, including a user device, which has a secure element and a secure device processor. The term "user," in this example, refers to a human user of the communication device. However, in other embodiments, the user can be a machine that exchanges data with the communication device 102 after being authenticated to the communication device. Communication device 102 can include a device processor 104, the SDP 106 and the secure element 108 (e.g., which can include a UICC). The secure element 108 can be various types of smart cards including a Subscriber Identification Module (SIM) card or other types of secure element. The secure element 108 can be a secure computing platform and can offer a high level of security for storing encryption keys, authentication credentials, and the like. The secure element 108 may be removable from the device. In other embodiments, the secure element 108 may be embedded in the device and not removable. In other embodiments, the secure element 108 can be placed on a memory card or an embedded chip.

The SDP 106 can be logically and/or physically separate from the device processor 104, and can be connected to both the device processor and the secure element 108. In this embodiment, the SDP 106 can offer a higher level of security than the device processor 104, and can store and execute secure applications. The SDP 106 can, for example, run applications in a trusted execution environment. The secure element 108 and SDP 106 together can form a secure services platform 110 resident on the device 102. In this embodiment, the secure element 108, the SDP 106 and the device processor 104 can each have a security level associated therewith, and the security level associated with the SDP 106 can be intermediate between that of the secure element 108 and that of the device processor 104. The SDP 106 and secure element 108 can use mutual authentication, as described in more detail below.

The secure element 108 and the SDP 106 can communicate with a remote management (function) server 120, located remotely from device 102. The Remote Management Server (RMS) 120 can be a platform for provisioning and/or managing applications in the secure element 108 and the SDP 106. The RMS 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No.

13/680,680 filed on Nov. 19, 2012, the disclosures of both of which are hereby incorporated by reference.

In this embodiment, communication device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth®, infra-red communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, in some embodiments a secure application server may not be used where the communication session is established in a peer-to-peer manner, such as in Bluetooth®, IRDa or NFC.

System 100 enables components of the secure services platform 110 (e.g., a secure upload engine of the SDP 106) to perform operations including one or more of requesting an upload transport key and a data protection key from a secure element 108 of the mobile communication device 102 where the secure element stores master keys from which the upload transport key and the data protection key are generated by the secure element, receiving the upload transport key and the data protection key without receiving the master keys, obtaining data for transmission to a recipient device, encrypting the data using the data protection key to generate a single encrypted data, or encrypting the single encrypted data using the upload transport key to generate a double encrypted data. In one or more embodiments, the secure upload engine of the SDP 106 can receive an upload request received via a user interface of the communication device 102 where the obtaining of the data is in response to the receiving of the upload request, receive a user credential via the user interface, provide the user credential to the secure element 108, and receive a user authentication from the secure element where the requesting of the upload transport key and the data protection key from the secure element is responsive to the receiving of the user authentication.

In one or more embodiments, the secure upload engine of the SDP 106 can facilitate establishing a communication channel with the recipient device and can provide the double encrypted data over the communication channel to the recipient device 150 and/or 175 to enable the recipient device to perform a first decryption of the double encrypted data utilizing a corresponding upload transport key. In one or more embodiments, the secure element 108 can receive the master keys from a remote management server 120 where the recipient device receives from the remote management server the corresponding upload transport key or a master transport key for deriving the corresponding upload transport key. In one or more embodiments, the SDP 106 and the secure element 108 can perform a mutual authentication with each other utilizing a keyset received via the remote management server 120, where the SDP can receive an upload request from one of the recipient device, another communication device, an application being executed by the mobile communication device, or a user input received at the mobile communication device 102, and where the obtaining of the data is in response to the receiving of the upload request. In one or more embodiments, the recipient device can be a removable memory device having a connection port to enable a physical coupling with the mobile communication device, and wherein the SDP 106 can provide the double encrypted data to the removable memory device via the connection port to enable the recipient device to be removed from the mobile communication device and subsequently coupled with an end user device for transmission of the double encrypted data to the end user device to enable the end user device to perform a first decryption of the double encrypted data utilizing a corresponding upload transport key. In one or more embodiments, the SDP 106 can receive an upload request received via a user interface where the obtaining of the data is in response to the receiving of the upload request, receive a user credential via the user interface, provide the user credential to the secure element 108, receive a user authentication from the secure element, and request the upload transport key and the data protection key from the secure element in response to the receiving of the user authentication.

System 100 enables components of the secure services platform 110 (e.g., a secure upload management function of the secure element 108) to perform operations including one or more of receiving master keys from the remote management server 120, storing the master keys in a secure element memory, and generating an upload transport key and a data protection key from the master keys. The secure element 108 can receive the master keys from the remote management server 120, and can receive a request from the secure device processor 106 for the upload transport key and the data protection key, where the generating of the upload transport key and the data protection key is in response to the request from the secure device processor. In one or more embodiments the secure element 108 can be provisioned from the remote management server 120 utilizing a remote management keyset.

System 100 enables components of the secure services platform 110 to upload or otherwise deliver data to the recipient device 150 and/or 175 through the use of encryption and modification by the SDP 106 according to derived keys that are generated by the secure element 108 from master keys (which are inaccessible to the SDP 106). The recipient device 150 can have access to one or more of the derived keys which can enable the recipient device to decrypt and un-modify the data so that the data is returned to its original form or the recipient device 150 can have limited access to the recipient keys such that the recipient data can only decrypt the data without being able to un-modify the data. Other devices, such as secondary recipient device 175 can retrieve or otherwise obtain the data from the recipient device 150. In one embodiment, other derived keys can subsequently be applied to the data during the delivery of the data from the recipient device 150 to the secondary recipient device 175.

In one or more embodiments, the recipient device 150 can be a removable memory device (e.g., a memory stick) having a connection port (e.g., a USB port) to enable a physical coupling with the communication device 102, and the secure device processor can provide encrypted modified data to the removable memory device via the connection port to enable the recipient device to be removed from the mobile communication device and subsequently coupled with an end user device 175 for transmission of the encrypted modified data to the end user device to enable the end user device to perform a decryption of the encrypted modified data utilizing a corresponding upload transport key.

In one or more embodiments, the derived key(s) (e.g., the data protection and upload transport keys) can be sent from the mobile communication device 102 (e.g., by the secure device processor 106) to the recipient device 150 (e.g., the application server) along with the encrypted modified data (e.g., in the same data channel or in different data channels) by encrypting the derived keys, such as using an asymmetric encryption technique. This exemplary embodiment could be utilized as an alternative to a derived key synchronization method described herein. Whether a derived key synchronization procedure is utilized or whether a transmission of the derived keys procedure is utilized can depend on a number of factors, such as a relationship between the mobile communication device 102 and the recipient device 150, the nature of the data (e.g., highly confidential vs. low-level confidential)

Figure 2:
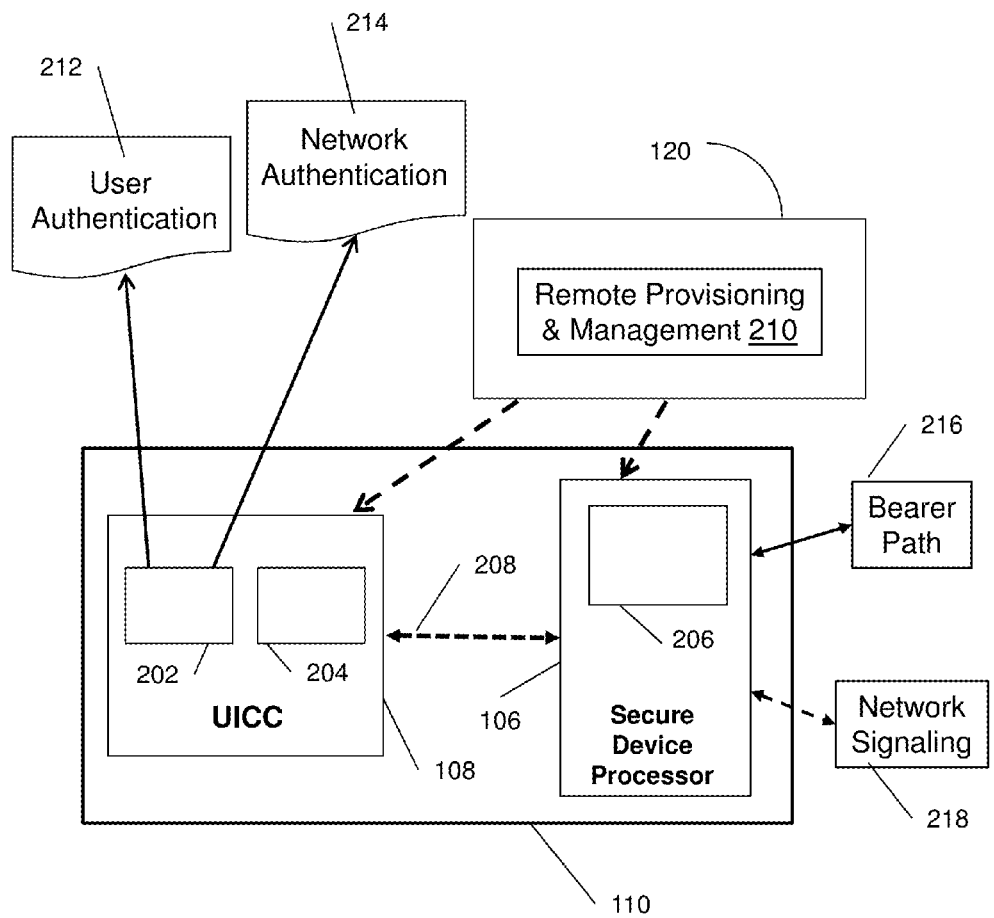
FIG. 2 depicts an illustrative embodiment of a system including the communication device of FIG. 1 implementing authentication and management functions, as well as provisioning functions.

FIG. 2 is a schematic illustration 200 showing details of a secure services platform 110, according to an embodiment of the disclosure, which can be used with the communication device 102 of FIG. 1. The secure element 108 can contain an authentication management function 202 and a real-time encryption key generator 204. The authentication management function 202 can provide authentication services for the device. For example, the authentication management function 202 can support mutual authentication of components of the device 102 or mutual authentication between different devices. As shown in FIG. 2, the authentication management function 202 can include a user authentication service 212 for authenticating the user to the device and a network authentication service 214 for authenticating the device to network equipment. The real-time encryption key generator 204 can supply encryption keys to a real-time encryption engine 206 which is located in the SDP 106. The real-time encryption engine 206 can encrypt and decrypt user information transmitted to or from a bearer path 216 that terminates at another device (e.g., another user device), and may encrypt and decrypt information transmitted on a signaling path 218 to the network. In another embodiment, the encryption engine can be loaded on a second secure element, separate from the secure element 108.

The RMS 120 can perform a remote provisioning and management function 210 to load applications, content and/or other information (e.g., various keysets) into the secure element 108 and/or SDP 106. In this embodiment, the RMS 120 can provision the authentication management function 202 and real-time encryption key generator 204 on the secure element 108, and can provision the real-time encryption engine 206 on the SDP 106. This can be done securely by the use of one or more remote management keysets. In one embodiment, before the secure services platform 110 can be used for communication, the SDP 106 can be authenticated by the secure element 108. In one embodiment, this can be done using a UICC-SDP keyset. The UICC-SDP keyset may be provisioned remotely by the RMS 120 or locally by an authorized user. In this embodiment, after the secure element 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the secure element 108 and the SDP 106 can go through the device processor 104 rather than directly between the secure element and the SDP.

In this embodiment of FIG. 2, the secure services platform 110 enables the secure delivery of data through encryption and modification by the SDP 106 according to derived keys that are generated from master keys stored by the secure element and which are inaccessible to the SDP 106. The modification of the data can include the adding of additional information to the data, such as authentication data, permissions, time stamps, user credentials, digital rights management information and so forth. The modification can also include encryption, such that the data is doubly encrypted utilizing separate derived keys (e.g., the upload transport key and the data protection key).

Figure 3A:
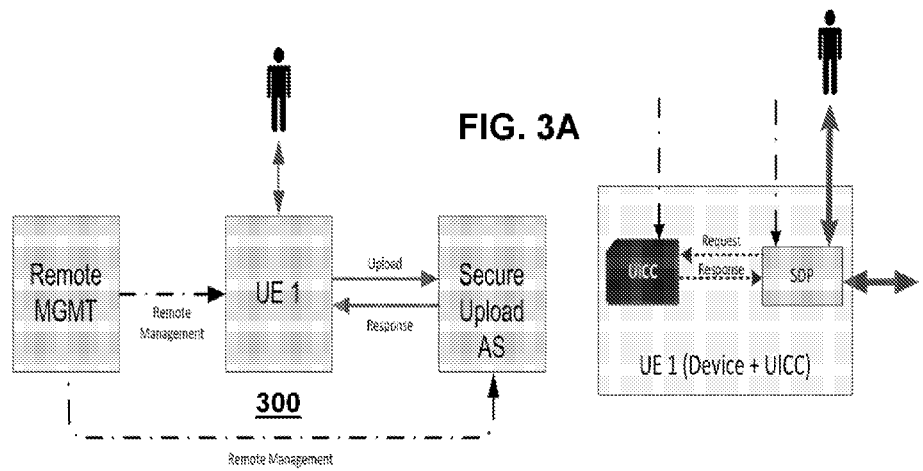
FIGS. 3A-3B depict an illustrative embodiment of a system that can be used for securely uploading or otherwise delivering data from a mobile communication device to a recipient device.
Figure 3B:
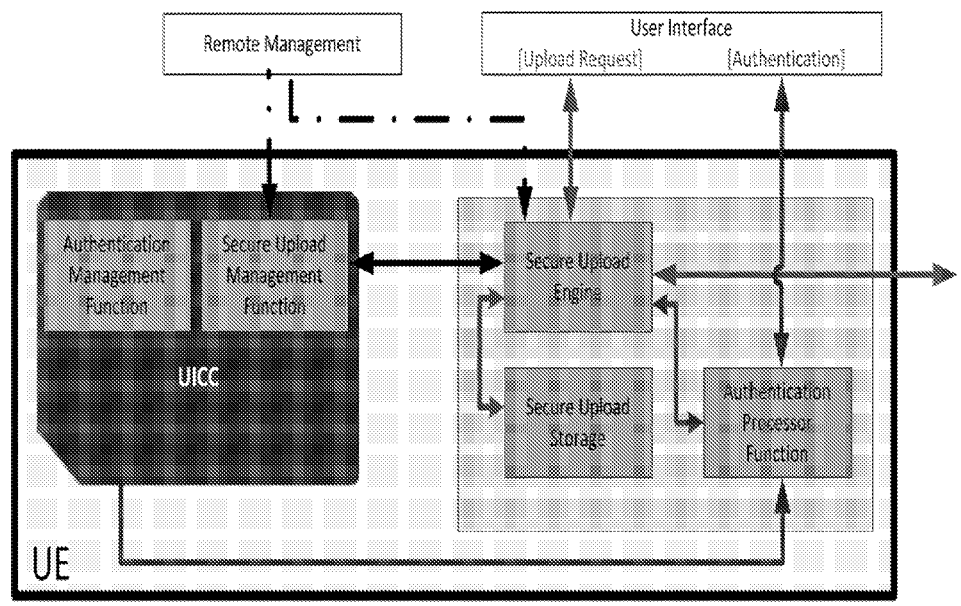

Referring to FIGS. 3A-B, a system 300 is depicted which illustrates a secure process in which data can be securely uploaded or otherwise delivered from a user device to a recipient device, such as an application server within the network, by using a secure element (which may exist within a UICC) and a secure device processor as a secure download platform. The secure element can include a secure upload management function which can perform the following tasks: storing a master set of keys and credentials; and/or providing derived keys to the secure upload engine. The secure device processor can include the secure upload engine which can perform the following tasks: processing user, device, and/or network requests to upload data; communicating with an authentication function to authenticate the user; authenticating and communicating with the secure upload application server to upload data; uploading data to the secure upload application server (or another recipient device such as another end user device or a memory device); communicating with the secure upload management function to obtain derived keys; and/or modifying data as specified by the derived keys it obtains from the secure upload management function.

The secure upload application server of FIG. 3A can perform the following tasks: storing uploaded data; decrypting and normalizing (e.g., un-modifying) data based on the keys it has stored; authenticating and communicating with the secure upload engine; storing a set of keys (e.g., derivative keys and/or master keys) provided to it by the remote management server; maintaining user information; processing requests from the user, another end user device and/or the network to download content or applications; and/or storing uploaded data. In one or more embodiments, the remote management server can create and load the secure upload applications described above into both the secure element (e.g., a UICC) and the secure device processor. The remote management server can also update the credentials and permissions that are stored in the secure upload management function. For example, these operations can be done securely by the use of one or more remote management keysets. These keysets can be used to mutually authenticate the UICC and the secure device processor with the remote management server and to enable encryption between them.

Figures 4A, 4B:
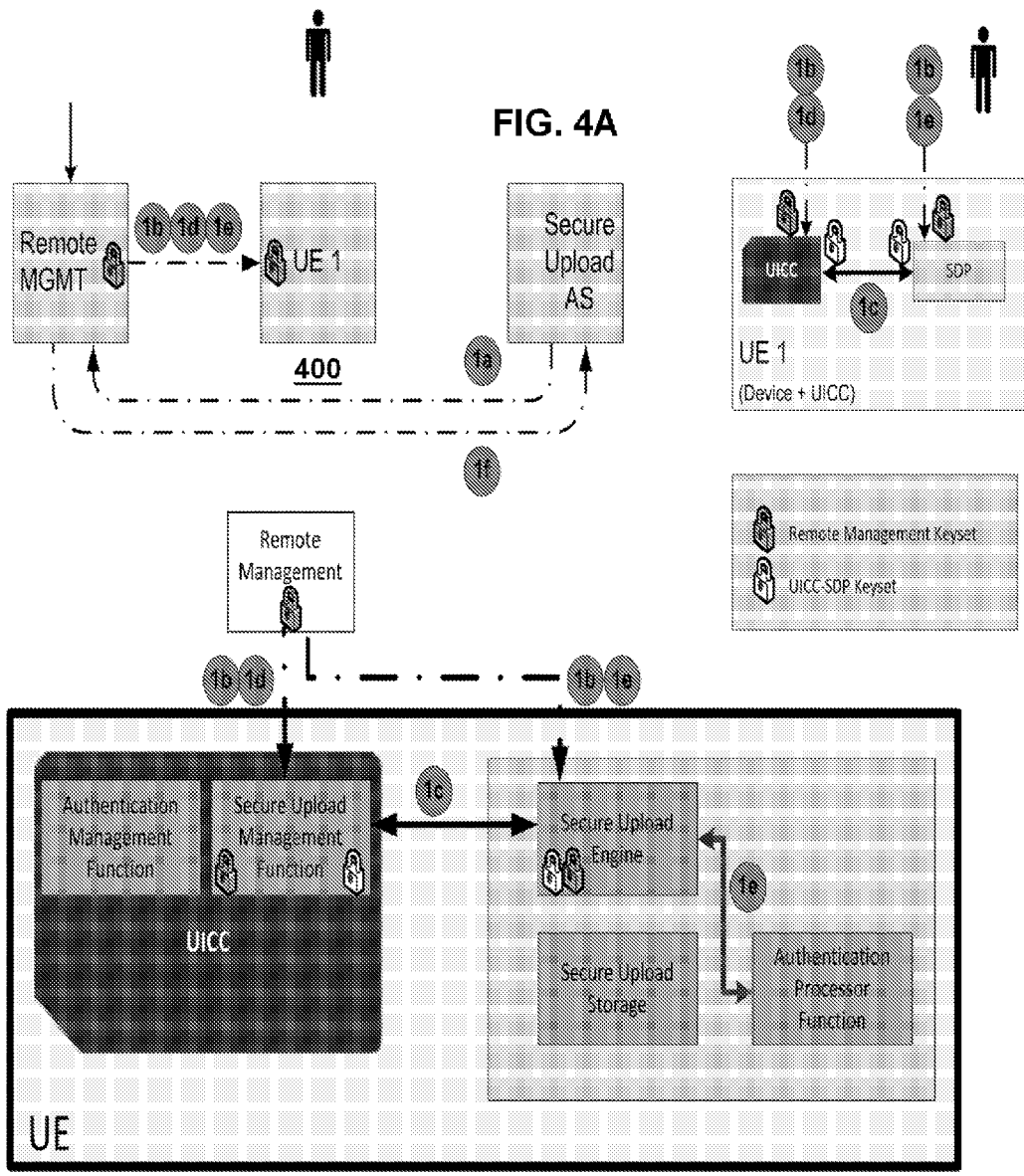
FIGS. 4A-4B depict an illustrative embodiment of a system that can be used for provisioning devices that are engaged in securely uploading or otherwise delivering data.

Referring to FIGS. 4A-B, system 400 is depicted which illustrates loading or otherwise provisioning the end user device(s) with the applications that are utilized by the secure services platform for performing the secure upload or delivery of data. Two applications can be loaded or otherwise provisioned to the mobile communication device: the secure upload management function and the secure upload engine. If the applications have not been loaded during the manufacturing process for the mobile communication device, then at 1a, upon receiving a request for the service, the secure upload application server can instruct the remote management server to download the secure upload management function to the UICC and to download the secure upload engine to the secure device processor. At 1b, the remote management server can download the secure upload management function to the UICC and the secure upload engine to the secure device processor. Remote Management Keysets can be used to securely transmit information from the remote management server to the mobile communication device. This process can involve mutual authentication and encryption. At 1c, the UICC and the secure device processor can mutually authenticate with each other once the two are provisioned using the UICC-SDP Keyset. At 1d, an initial set of user credentials and master keysets are sent from the remote management server to the secure upload management function. This can include a master upload transport keyset and a master data protection/encryption keyset. At 1e, the remote management server can instruct the secure upload engine to register and associate with an authentication processor function. The secure upload engine can register and associate with the authentication processor function. At 1f, the remote management server can transmit the upload transport keyset to the secure upload application server and may or may not also transmit the data encryption keyset.

Figure 5A:
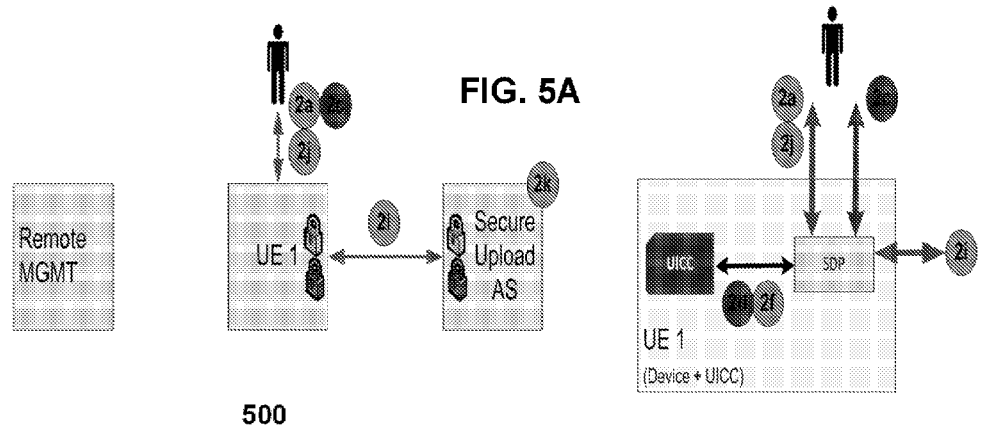
FIGS. 5A-5B depict an illustrative embodiment of a system that can be used for securely uploading or otherwise delivering data from a mobile communication device to a recipient device.
Figure 5B:
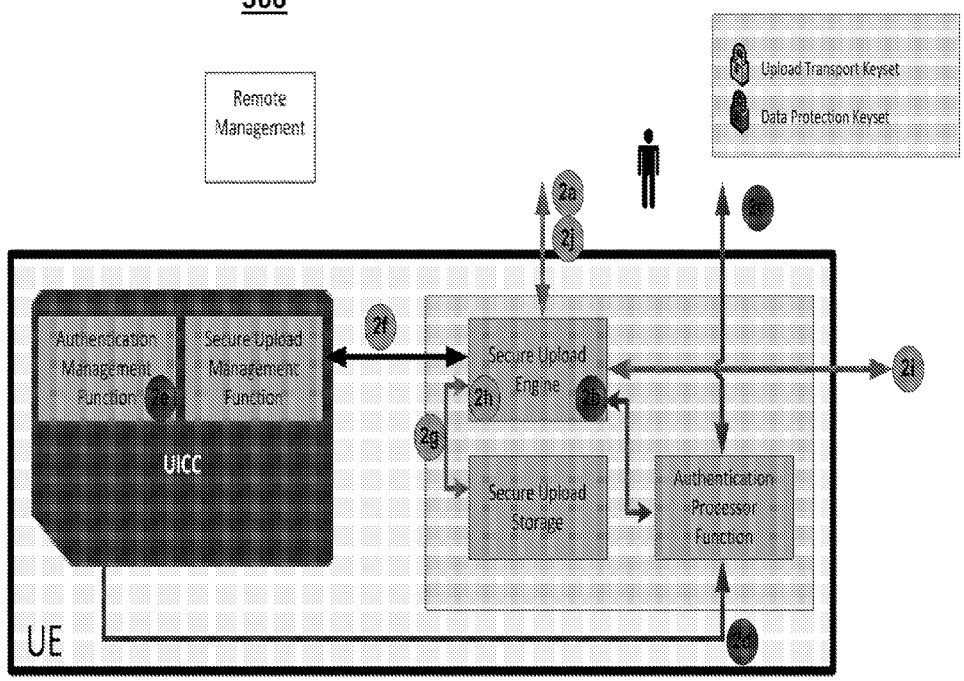

Referring to FIGS. 5A-B, system 500 is depicted which illustrates a process for securely uploading or delivering data from a mobile communication device to a recipient device through use of multiple derived keys that enable encryption and modification of the data. This process can involve the secure upload of data already stored in the device to the recipient device, which in this example is described as a secure upload application server, although various other devices can be recipient devices, such as other end user devices, memory devices, and so forth. As an example, the user can select data that is already stored in the device for transmission. This example is described according to user input by a user at the mobile communication device, however, the exemplary process can also be initiated according to an application executed by the mobile communication device or by another device. At 2a, the user selects a set of data that is stored in the device is to be uploaded securely to the secure upload application server. At 2b, the secure upload engine checks to see if the user has been previously authenticated and, if so, whether or not the user needs to be re-authenticated. If the user is to be authenticated, the secure upload engine can request for the authentication processor function to authenticate the user. As an example, at 2c, the authentication processor function can prompt the user to authenticate, such as using a pre-determined method. At 2d, once the authentication processor function obtains the credential from the user, it processes the credential for analysis by the authentication management function. At 2e, the authentication management function can analyze the credential and can verify whether or not the user should be authenticated. At 2f, once authentication is verified, the secure upload engine can request an upload transport key and a data protection key from the secure upload management function. These keys can be derived from a master set of keys stored within the secure upload management function. These keys may be used for a variety of security purposes including encryption and authentication. The data protection key may also include other types of information to protect the data including a time stamp and user defined credentials. At 2g, the secure upload engine can locate and retrieve the user selected data from the secure upload storage. In one embodiment, the secure upload storage may not necessarily be within the secure device processor, for example, it can be stored in a memory of the device processor 104. At 2h, the secure upload engine can apply the derived data protection key to the data that was retrieved from the secure upload storage. At 2i, the secure upload engine can establish a data channel (or other communication connection depending on the communication protocol being utilized) with the secure upload application server. The two can mutually authenticate with each other using the authentication parameters of the derived upload transport key. Once mutually authenticated, the secure upload engine can transmit the data to the secure upload application server. The data may be encrypted using the encryption parameters of the derived upload transport key. At 2j, the user can be notified if the transmission was successful or not. Re-transmission (of all or some of the data) can also be implemented by the secure device processor, such as based on a detected transmission error. In one embodiment at 2k, the secure upload application server can decrypt the data using first the upload transport key and then again using the data protection key if it has one. If the secure upload application server has decrypted the data using the data protection key, the data is now subject to modification including the addition of new credentials, file permissions, and/or re-encryption.

Figure 6:
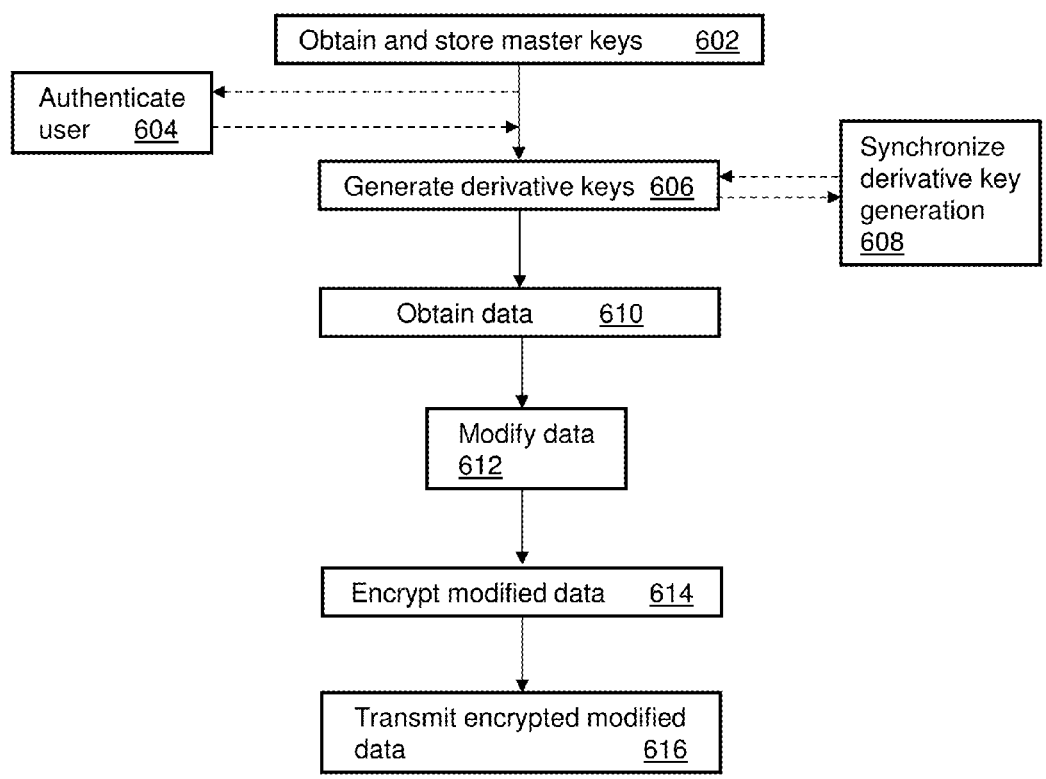
FIG. 6 depicts an illustrative embodiment of a method used in portions of the systems described in FIGS. 1-5B.

FIG. 6 depicts an illustrative embodiment of a method for providing secure upload or delivery of data from a mobile communication device to a recipient device, such as an application server, another end user device, a removable memory device, and so forth. Method 600 is described as being performed by the secure services platform 110, however, all or a portion of the steps of method 600 can be performed by various devices or individual components of devices. More or less than the steps described in method 600 can be performed in one or more exemplary embodiments, and the order of steps can be rearranged.

Method 600 can begin at 602 where one or more master keys are received and stored by the secure element 108 of the mobile communication device 102. The secure element 108 can store the master keys (e.g., in a secure element memory which can be a physically or logically isolated and separate component from other memory of the mobile communication device 102) without allowing other components or other devices to access the stored master keys, such as prohibiting the secure device processor 106 and/or the device processor 104 from accessing the master keys. In one or more embodiments, the master keys can be received from a remote management server, where the remote management server can distribute corresponding master keys (for some or all of those master keys) to other devices (e.g., recipient devices 150 and/or 175). In one embodiment, the provisioning of the master keys to the secure element 108 can be performed utilizing a remote management keyset. In another embodiment, mutual authentication (e.g., of the secure element 108, the secure device processor 106, and/or the remote management server 120) can be performed or required prior to the master keys being provisioned to the secure element 108.

In one embodiment at 604, a user that is associated with an upload request (e.g., request to upload to an application server, request to transfer data to a removable memory device, request to transmit data to another end user device or other device) can be authenticated. For instance, the authentication can be based on a user credential(s) that is received by the secure device processor 106 via user input at the mobile communication device 102, where the user credential is compared with a corresponding user credential stored by the secure element 108. Various types of user credentials can be used for user authentication, including user identification information, passwords, biometric data, and so forth. Various other types of authentication processes can be implemented at the mobile device 102, such as described in U.S. application Ser. No. 14/061,380 filed on Oct. 23, 2013, the disclosure of which is hereby incorporated by reference.

In one or more embodiments, the upload request can be initiated based on user input at the mobile communication device 102. However, the upload request can be initiated by other sources, such as an upload request initiated by an application being executed on the mobile communication device 102, which may or may not require user authentication (e.g., as performed at 604). In one embodiment of this example, the upload request can be performed automatically without notice being provided to the user of the mobile communication device 102. In another embodiment of this example, the upload request can be initiated automatically but can provide notice or request authorization from the user to proceed, such as a notice or permission request being presented at the mobile communication device 102. In another embodiment, the upload request can be initiated by another device, which may or may not require user authentication (e.g., as performed at 604). For instance, an application server or another end user device may transmit the upload request to the mobile communication device 102 where it is processed by the secure device processor 106.

At 606, derivative key(s) can be generated from the master key(s) by the secure element 108. The derivative key(s) can be provided from the secure element 108 to the secure device processor 106 without providing the master key(s) to the secure device processor. For example, the secure element 108 can generate an upload transport key and a data protection key from a master transport key and a master protection key, respectively, that are being stored by the secure element memory (which is inaccessible to the secure device processor 106). The secure element 108 can then provide the upload transport key and the data protection key to the secure device processor 106 without providing the master transport key and the master protection key to the secure device processor.

In one or more embodiments at 608, the generating of the derivative keys by the secure element 108 can be synchronized with a generation of a corresponding derivative key at another device, such as at the recipient device 150, the secondary recipient device 175, the remote management server 120, or another device that can provide the derivative key to the recipient device 150 and/or 175. The synchronization can occur in numerous ways, such as a notice to establish synchronization being sent by the secure element 108 to the device that will be generating the corresponding derivative key(s). The notice can include information that enables the corresponding key to be generated, including time data, identification data, and so forth.

The timing of the generation of the derivative keys can vary. For example, the secure element 108 can generate the derivative keys in response to a request for the derivative keys from the secure device processor 106. The request for the derivative keys can be provided by the secure device processor 106 to the secure element 108 before or after user authentication 604 (if performed). In one embodiment, some of these processes can be performed simultaneously to expedite the process. For instance, the initiation of the generation of the derivative keys by the secure element 108 can be performed in response to a generation request from the secure device processor 106 which is triggered by the upload request. In this example, the user authentication at 604 can be performed while the derivative keys are being generated. Continuing with this example, in the event that the user authentication is not successful or otherwise cannot be completed, the generated derivative keys can be deleted or otherwise rendered inoperable by the secure element 108 without providing the derivative keys to the secure device processor 106. In one embodiment, initiating generation of the derivative keys prior to the user authentication process being completed can provide time for other steps that may be taken as part of the derivative key process, such as communication with a recipient device for synchronization of generation of corresponding derivative keys at 608.

At 610, the secure device processor 106 can obtain the data that is to be transmitted to the recipient device 150. The data can be stored at various locations of the mobile communication device, such as a secure upload storage of the secure device processor 106 which is logically or physically isolated from other memory outside of the secure device processor. The data can also be obtained from the device processor 104, such as stored in a memory of the mobile communication device 102 that is accessible to the device processor 104.

At 612, the data can be modified by the secure device processor 106 using a first derivative key (e.g., the data protection key) to generate modified data. The data modification process by the secure device processor 106, which utilizes the data protection key, can involve adding additional information to the data and/or encrypting the data. The additional information can be various types of information, such as authentication data, permissions, timestamps, and so forth.

At 614, the secure device processor 106 can encrypt the modified data using the upload transport key to generate an encrypted modified data. In one or more embodiments, the data is now double encrypted data (e.g., a first encryption according to the data protection key and a second encryption according to the upload transport key).

At 616, the encrypted modified data can be transmitted or provided by the secure device processor 106, such as via a transceiver of the mobile communication device 102 that can be controlled by the device processor 104, to the recipient device 150. This can be performed via a wireless communication session (e.g., establishing a data channel) between the mobile communication device 102 and the recipient device 150 or can be performed via a physical connection with the recipient device 150, such as where the recipient device 150 is a memory stick that has been removably connected with the mobile communication device via a Universal Serial Bus (USB) port of the mobile communication device 102.

In one or more embodiments, first executable instructions (e.g., the secure upload management function) can be provisioned to the secure element memory and second executable instructions (e.g., the secure upload engine) can be provisioned to the secure device processor memory from the remote management server 120, such as utilizing a remote management keyset.

In one embodiment, the providing of the encrypted modified data to the recipient device can enable the recipient device to perform a decryption of the encrypted modified data utilizing a corresponding upload transport key. In this example, the recipient device does not have access to a corresponding data protection key so that the recipient device, after the decryption, provides storage only in the form of modified data (which may be encrypted data according to the data protection key). Further to this example, other devices, such as the mobile communication device 102 or the secondary recipient device 175, can have the necessary data protection key so that the modified data can be retrieved from the recipient device 150 and can be unmodified (e.g., performing a second decryption based on the data protection key) to provide access to the original data.

In another embodiment, the recipient device 150 can have both the corresponding data protection key and the corresponding upload transport key so that the encrypted modified data can be returned to, and stored in, its original form at the recipient device. Whether or not the recipient device has one or both of the corresponding data protection key and the corresponding upload transport key can depend on various factors, such as the type of data, ownership of the data, type of recipient device, identity of the entity operating the recipient device (e.g., a governmental authority vs. a private entity), and so forth.

In one or more embodiments, the recipient device(s) can receive from a remote management server a corresponding derived key (e.g., the corresponding upload transport key and/or the corresponding data protection key) and/or can receive a master key(s) (e.g., a master transport key and/or master protection key) for deriving the corresponding derived key (e.g., the corresponding upload transport key and/or the corresponding data protection key).

In one or more embodiments, the recipient device can be a removable memory device (e.g., a memory stick) having a connection port (e.g., a USB port) to enable a physical coupling with the communication device, and the secure device processor can provide encrypted modified data to the removable memory device via the connection port to enable the recipient device to be removed from the mobile communication device and subsequently coupled with an end user device for transmission of the encrypted modified data to the end user device to enable the end user device to perform a decryption of the encrypted modified data utilizing a corresponding upload transport key.

Figure 7:
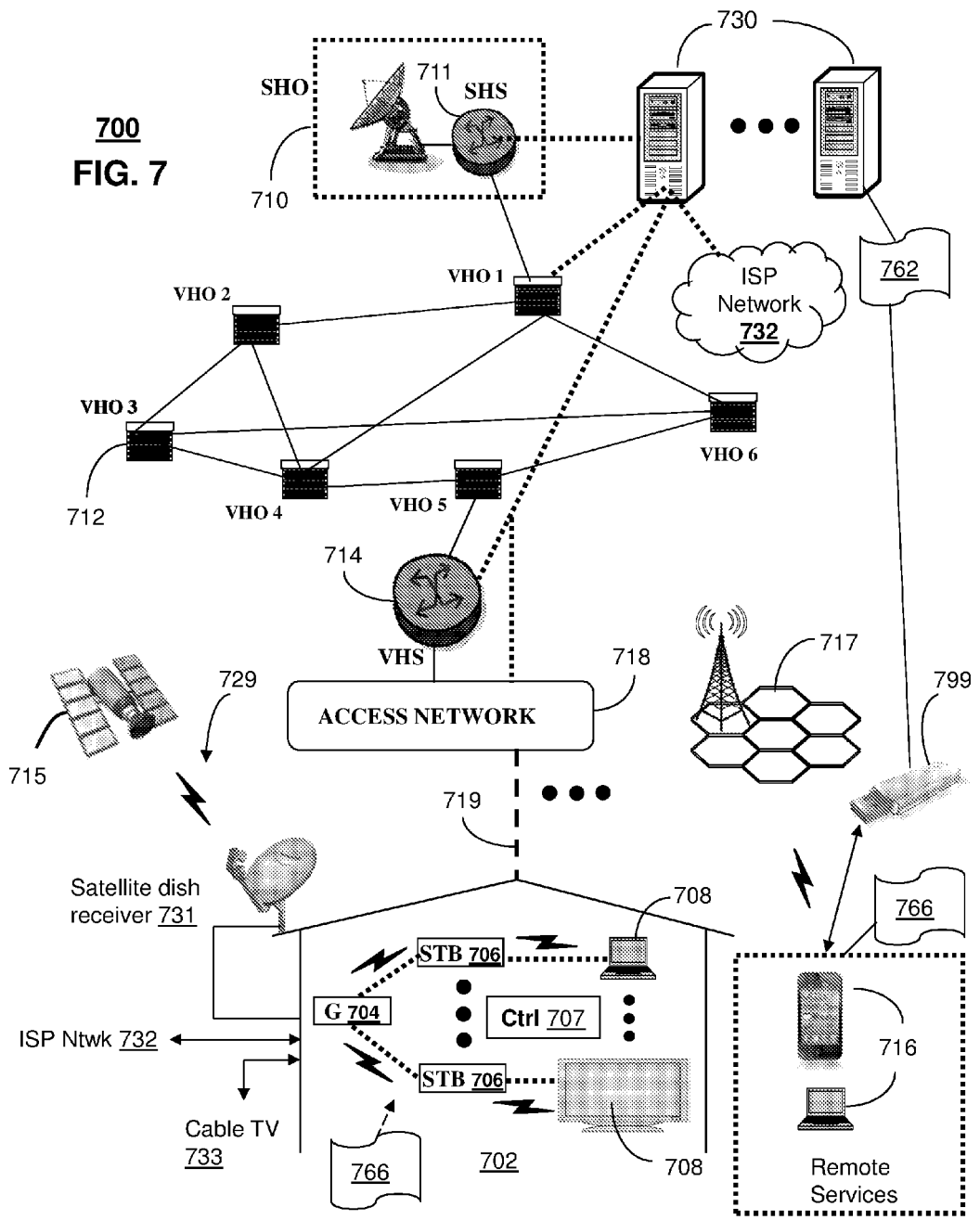
FIG. 7 depicts an illustrative embodiment of a communication system that provides media services including securely uploading or otherwise delivering data from a mobile communication device to a recipient device.

FIG. 7 depicts an illustrative embodiment of a communication system 700 for delivering media content. The communication system 700 can represent an Internet Protocol Television (IPTV) media system. Communication system 700 can be overlaid or operably coupled with systems 100, 200 of FIGS. 1 and 2 as another representative embodiment of communication system 700. In one or more embodiments, system 700 enables utilizing both the secure element and secure device processor together to provide a secure platform for uploading or otherwise delivering data to a recipient device where the data is encrypted and modified utilizing derived keys that are generated from master keys having limited accessibility.

System 700 can enable data (e.g., video content, image content, audio content, application data, gaming data, and so forth) to be securely uploaded from a mobile communication device responsive to a request that is initiated by a user, by the mobile communication device, by a network device (e.g., the application server), and/or by another communication device (e.g., another end user device). In one or more embodiments, data can be modified before transmission. This modification may include encryption, and/or the addition of information, such as authentication data, permissions, and other types of information. In one or more embodiments, the secure device processor can perform the modification of the data and the transmission of the modified and/or encrypted data. In one or more embodiments, a set of master keys can be stored in the secure element, which may exist in the form of a UICC. A subset of these keys can be stored in another device, such as the application server. In one or more embodiments, keys derived from the master keys can be used to modify the data for transmission.

In one or more embodiments of the system 700, master keys, which are stored at the UICC, do not leave the UICC. In one or more embodiments, the application server or other recipient device may unmodify the data depending on the keys accessible to it or otherwise in its possession. In one or more embodiments, the user can be authenticated to the UICC, the UICC can be mutually authenticated with the secure device processor, and the UICC can be mutually authenticated with the application server (or other intended recipient device). In one or more embodiments, an authentication function can be used. In one or more embodiments, the data can already be stored within the device. In one or more embodiments, the functions within the mobile communication device can be managed remotely by the remote management server. In one or more embodiments, the master keys can be provisioned remotely by the remote management server. In one or more embodiments, the master keys can be loaded into the secure element from the network using a very high security process based on GlobalPlatform. This path can be separate and isolated from the path (e.g., a data channel) in which data is uploaded from the mobile communication device. In one or more embodiments, uploaded data may be "owned" either by the user or by the network administrator.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies (Bluetooth® and ZigBee® are trademarks registered by the Bluetooth Special Interest Group and the ZigBee Alliance, respectively). By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for computing devices 730 to function as a remote management server and/or an application server (herein referred to as server 730). The server 730 can use computing and communication technology to perform function 762, which can include among other things, provisioning various devices or components, such as through use of remote management keysets. The provisioning can be of applications, such as the secure upload management function and/or the secure upload engine, and/or can be of keysets, such as master keys, upload transport keys, data protection keys, and so forth. Function 762 can include one or more of providing an upload request to a mobile communication device to cause a secure device processor of the mobile communication device to perform a first encryption of data according to a data protection key to generate a single encrypted data and to perform a second encryption of the single encrypted data according to an upload transport key to generate a double encrypted data where the secure element receives master keys from a remote management server and stores the master keys to enable the upload transport key and the data protection key to be generated by the secure element without providing the master keys to the secure device processor, receiving the double encrypted data, obtaining a corresponding upload transport key, decrypting the double encrypted data utilizing the corresponding upload transport key to obtain the single encrypted data, and storing the single encrypted data in a memory accessible to the server. In one embodiment, the obtaining of the corresponding upload transport key can include receiving a master transport key, generating the corresponding upload transport key from the master transport key.

Function 762 can also include deleting the corresponding upload transport key after the decrypting of the double encrypted data. In one embodiment, the obtaining of the corresponding upload transport key can include receiving, from a remote management server, the corresponding upload transport key, and the function 762 can include deleting the corresponding upload transport key after the decrypting of the double encrypted data. In one embodiment, the server 730 may not have access to a corresponding data protection key for decrypting the single encrypted data, and function 762 can include receiving from the mobile communication device a download request associated with the data, generating a second upload transport key from a master transport key received from the remote management server where the obtaining of the corresponding upload transport key comprises deriving the corresponding upload transport key from the master transport key, encrypting the single encrypted data using the second upload transport key to generate the double encrypted data, and providing the double encrypted data to the mobile communication device to enable the secure device processor to decrypt the double encrypted data utilizing a corresponding second transport key generated by the secure element from the master keys without providing the master keys to the secure device processor.

Function 762 can include receiving from the remote management server a master protection key, storing the master protection key, generating a corresponding data protection key from the master protection key, decrypting the single encrypted data utilizing the corresponding data protection key to obtain the data, and deleting the corresponding data protection key after the decrypting of the single encrypted data. Function 762 receiving from the remote management server a corresponding data protection key, decrypting the single encrypted data utilizing the corresponding data protection key to obtain the data, and deleting the corresponding data protection key after the decrypting of the single encrypted data.

Function 766 can include functions being performed at the secure element 108 including one or more of receiving master keys from a remote management server, storing the master keys in the secure element memory, generating an upload transport key and a data protection key from the master keys, mutually authenticating with the secure device processor 106, or receiving a request from the secure device processor for the upload transport key and the data protection key where the generating of the upload transport key and the data protection key is in response to the request from the secure device processor.

Function 766 can also include functions being performed at the SDP 106 such as one or more of requesting an upload transport key and a data protection key from a secure element of the mobile communication device where the secure element 108 stores master keys from which the upload transport key and the data protection key are generated by the secure element, receiving the upload transport key and the data protection key without receiving the master keys, obtaining data for transmission to a recipient device, encrypting the data using the data protection key to generate a single encrypted data, encrypting the single encrypted data using the upload transport key to generate a double encrypted data, receiving an upload request received via a user interface of the mobile communication device where the obtaining of the data is in response to the receiving of the upload request, receiving a user credential via the user interface, providing the user credential to the secure element, receiving a user authentication from the secure element, wherein the requesting of the upload transport key and the data protection key from the secure element is responsive to the receiving of the user authentication, facilitating establishing a communication channel with the recipient device, providing the double encrypted data over the communication channel to the recipient device to enable the recipient device to perform a first decryption of the double encrypted data utilizing a corresponding upload transport key, receiving an upload request from one of the recipient device, another communication device, an application being executed by the mobile communication device, or a user input received at the mobile communication device where the obtaining of the data is in response to the receiving of the upload request, or providing the double encrypted data to the removable memory device via the connection port to enable the recipient device to be removed from the mobile communication device and subsequently coupled with an end user device for transmission of the double encrypted data to the end user device to enable the end user device to perform a first decryption of the double encrypted data utilizing a corresponding upload transport key.

System 700 can include a memory device 799, which is depicted as a USB compatible memory stick, although other memory devices that can be physically connected with communication devices can also be utilized. Memory device 799 can perform all or a portion of functions 766 to enable the secure upload or delivery of data which the memory device 799 receives from a mobile communication device. As an example, the memory device 799 can have a connection port to enable a physical coupling with a mobile communication device, and the mobile communication device can providing double encrypted data to the removable memory device 799 via the connection port (e.g., USB port) to enable the memory device 799 to be removed from the mobile communication device and subsequently coupled with an end user device for transmission of the double encrypted data to the end user device to enable the end user device to perform a first decryption of the double encrypted data utilizing a corresponding upload transport key.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
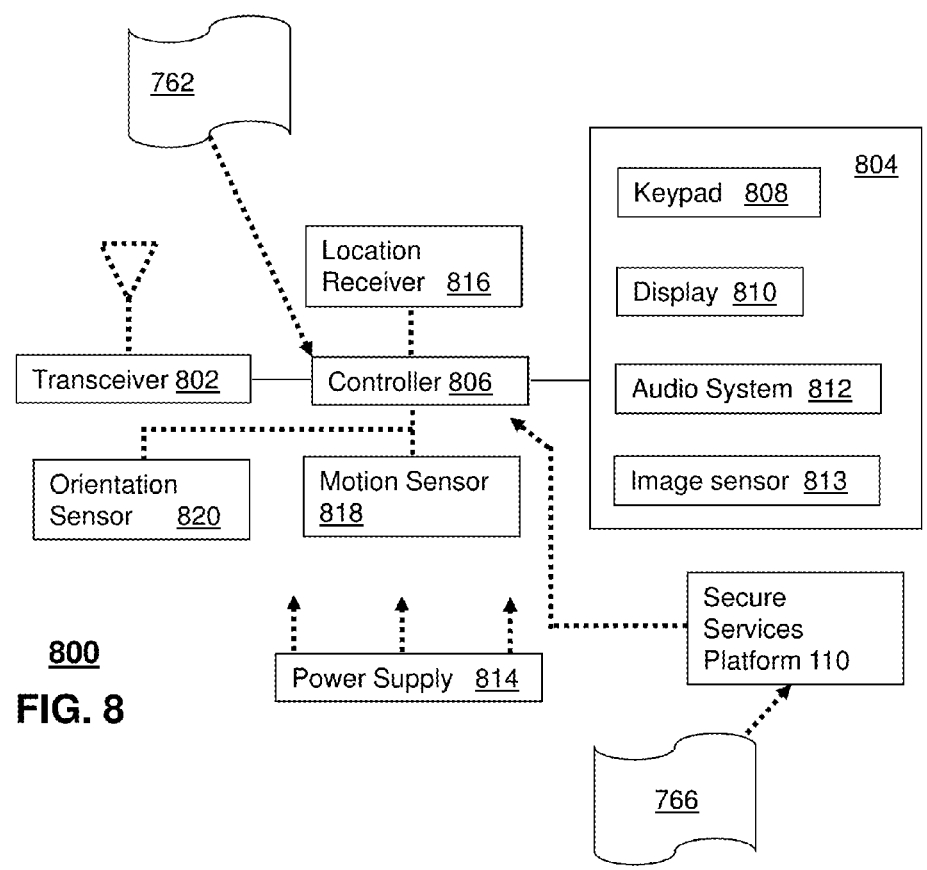
FIG. 8 depicts an illustrative embodiment of a communication device that can provide for secure upload or otherwise delivery of data from a mobile communication device to a recipient device.

FIG. 8 depicts an illustrative embodiment of a communication device 800. Communication device 800 can serve in whole or in part as an illustrative embodiment of the devices depicted in FIGS. 1-5 and 7. For instance, device 800 can include a secure element (e.g., executing an administrative agent key function) and a secure device processor (executing an administrative agent function) in the secure services platform 110 which perform the functions described in the exemplary embodiments herein.

In one or more embodiments, the secure element of device 800 can perform operations including receiving master keys from a remote management server, storing the master keys in the secure element memory, and generating derivative keys (e.g., an upload transport key and a data protection key) from the master keys. The derivative keys can be provided to the secure device processor of device 800 without providing the master keys to enable the secure device processor to change or manipulate the data, such as encryption(s), modification(s), and so forth.

In one or more embodiments, the secure device processor of device 800 can perform operations including receiving the derivative keys (e.g., the upload transport key and the data protection key) from the secure element without receiving the master keys, obtaining data for transmission to a recipient device, modifying the data using the data protection key to generate modified data, and encrypting the modified data (e.g., using the upload transport key) to generate an encrypted modified data. The secure device processor of device 800 can provide a request to the secure element for the derivative keys, such as the upload transport key and the data protection key, where the generating of the derivative keys, such as the upload transport key and the data protection key, is in response to the request from the secure device processor. In one or more embodiments, the secure device processor can receive an upload request received via a user interface where the obtaining of the data is in response to the receiving of the upload request, receive a user credential via the user interface, provide the user credential to the secure element, receive a user authentication from the secure element, and request the derivative keys, such as the upload transport key and the data protection key, from the secure element in response to the receiving of the user authentication. In one or more embodiments, the secure device processor can provide the encrypted modified data over a communication channel to the recipient device to enable the recipient device to perform a decryption of the encrypted modified data utilizing a corresponding upload transport key. In one or more embodiments, the secure device processor can provide the encrypted modified data to the removable memory device via the connection port to enable the recipient device to be removed from the communication device and subsequently coupled with an end user device for transmission of the encrypted modified data to the end user device to enable the end user device to perform a decryption of the encrypted modified data utilizing a corresponding upload transport key.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, NFC, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. In one embodiment, the communication device 800 can also include a slot for adding or removing the UICC.

The communication device 800 as described herein can operate with more or less of the circuit components shown in FIG. 8. These variant embodiments can be used in one or more embodiments of the subject disclosure.

The communication device 800 can be adapted to perform the functions of the media processor 706, the media devices 708, the portable communication devices 716 and/or the server 730 of FIG. 7. It will be appreciated that the communication device 800 can also represent other devices that can operate in communication system 700 of FIG. 7, such as a gaming console and a media player.

The communication device 800 shown in FIG. 8 or portions thereof can serve as a representation of one or more of the devices of FIGS. 1-5 and 7 including end user devices, removable memory devices, customer premises equipment, remote management servers, application servers, and so forth. In one or more embodiments, the recipient device can be servers operated by, or otherwise affiliated with, a third party entity that is different from and/or independent of the service provider operating the remote management server. In addition, the controller 806 can perform the functions 762 and/or 766.

Upon reviewing the aforementioned embodiments, it would be evident to an artisan with ordinary skill in the art that said embodiments can be modified, reduced, or enhanced without departing from the scope of the claims described below.

For example, the derivative key(s) can be one-time use keys which are deleted or otherwise rendered inoperable after being applied to the data, such as for encryption, modification, decryption and/or un-modification.

In one embodiment, encryption can be applied based on elliptical curve cryptography, Advance Encryption Standard (AES), and so forth. Other encryption techniques can be utilized, including symmetrical and/or asymmetrical cryptographic methods. In another embodiment, the secure element 108 can communicate with the recipient device for synchronization of the derivation of keys (e.g., the derivation of the upload transport key and the data protection key) from the master keys.

In one or more embodiments, the "master key" (e.g., the master transport key or the mast protection key) can be a static key that is derived or otherwise generated by the remote management server 120 from "a Master Key" and transported to the secure element 108 (e.g., the UICC) and/or the recipient device 150 (e.g., the application server). For example, the following key hierarchy can be used:
Master Key [RMS]->Derived Key [UICC, AS] (e.g., the "master key", "master transport key", "master upload transport keyset", "master data protection keyset")->Temporary Keys [SDP, AS] (e.g., the "upload transport key", "data protection key", "derived key").

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
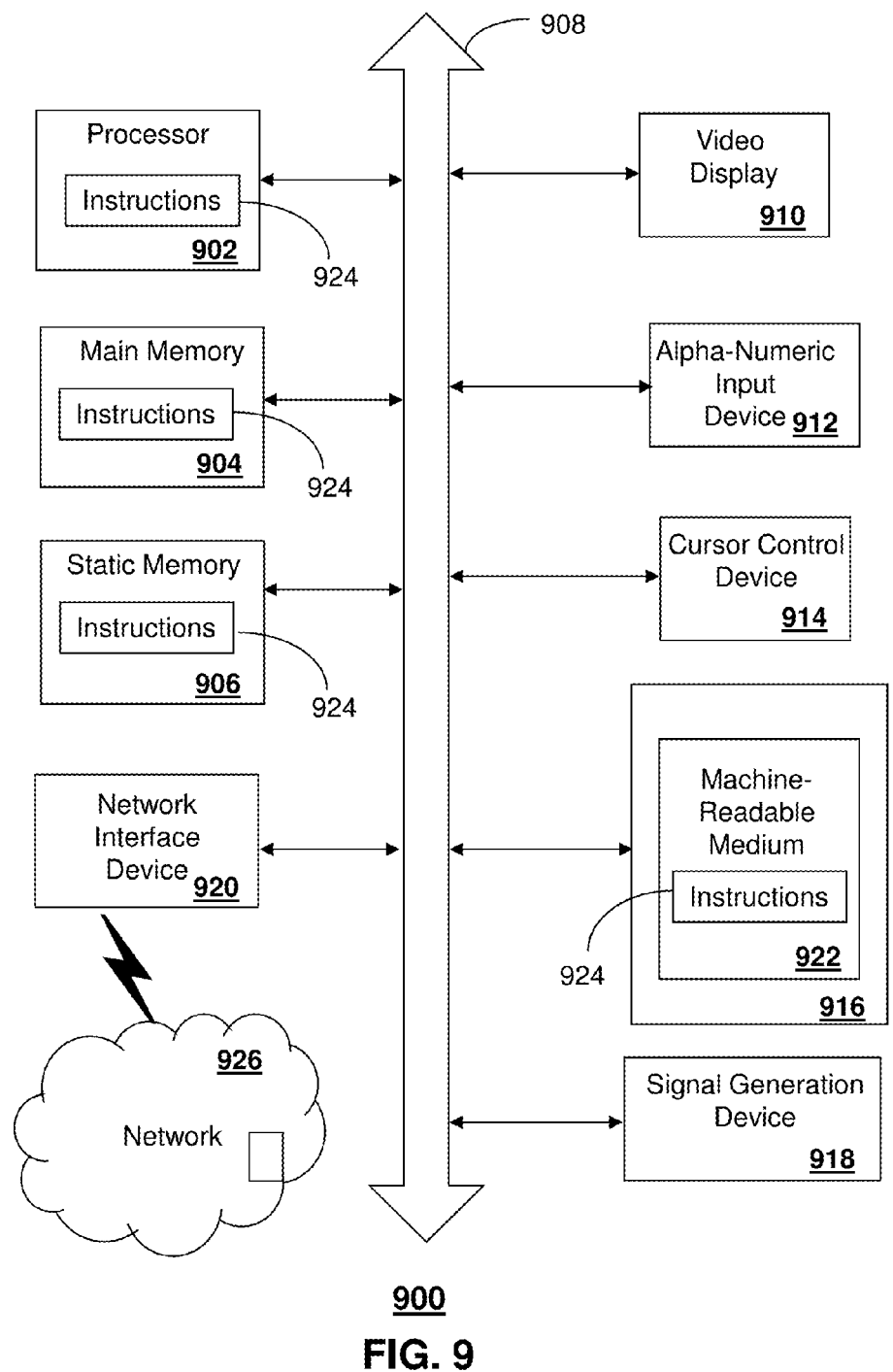
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can provide for secure upload or delivery of data from a mobile communication device to a recipient device utilizing various keysets, such as the upload transport keys and the data protection keys. One or more instances of the machine can operate, for example, as the mobile communication device, the application server, the recipient device, the recipient end user device, the recipient removable memory device, the remote management server, the secure services platform (e.g., the secure element and/or the SDP), the device processor, and so forth. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "separate" can include a component or device that is logically and/or physically separate from another component or device, which can include components/devices that operate independently of each other while being in communication with each other. In one or more embodiments, devices can be separate in that they do not share any common component (although such separate devices can be in communication with each other such as via an electrode coupling). In one or more embodiments, devices can be separate in that they each have one or more components that are not shared between each other but have one or more components that may be shared with each other.

The term "tangible computer-readable storage medium" shall accordingly be taken to include, but not be limited to: solid-state memories such as a memory card or other package that houses one or more read-only (non-volatile) memories, random access memories, or other re-writable (volatile)

memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®, NFC), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    receiving, by a processing system including a processor, a master transport key from a remote management server;
    generating, by the processing system, a corresponding upload transport key from the master transport key;
    receiving, by the processing system, double encrypted data from a communication device, wherein the double encrypted data is generated from data based on a data protection key, wherein the data protection key is used in a first encryption to generate a single encrypted data and a second encryption of the single encrypted data is generated according to an upload transport key;
    decrypting, by the processing system, the double encrypted data utilizing the corresponding upload transport key to obtain the single encrypted data;
    receiving, by the processing system, a master protection key from the remote management server;
    storing, by the processing system, the master protection key;
    generating, by the processing system, a corresponding data protection key from the master protection key; and
    decrypting, by the processing system, the single encrypted data utilizing the corresponding data protection key to obtain the data,
    wherein a Universal Integrated Circuit Card (UICC) of the communication device receives the master transport key and the master protection key over a network from the remote management server, and wherein the communication device includes a secure device processor separate from and in communication with the UICC, wherein the UICC and the secure device processor are separate components in communication with each other.

2. The method of claim 1, wherein the remote management server stores the master transport key and the master protection key to enable the upload transport key and the data protection key to be generated.

3. The method of claim 1, further comprising:
deleting, by the processing system, the corresponding upload transport key after the decrypting of the double encrypted data.

4. The method of claim 1, further comprising:
storing, by the processing system, the single encrypted data in a memory accessible to the processing system.

5. The method of claim 4, further comprising:
deleting, by the processing system, the corresponding data protection key after the decrypting of the single encrypted data.

6. The method of claim 3, wherein the corresponding upload transport key and the upload transport key are a same key.

7. The method of claim 1, wherein the UICC provides the upload transport key and the data protection key to the secure device processor without providing the master transport key and the master protection key to the secure device processor.

8. The method of claim 1, wherein the UICC and the secure device processor perform a mutual authentication procedure utilizing a keyset received via the remote management server.

9. A device, comprising:
a processing system including a processor; and
a memory that stores executable instructions that, when executed by the processing system, facilitate performance of operations comprising:
receiving a master transport key from a remote management server;
generating a corresponding upload transport key from the master transport key;
receiving double encrypted data from a communication device, wherein the double encrypted data is generated from data based on a data protection key that generates a single encrypted data and a second encryption of the single encrypted data according to an upload transport key;
receiving a master protection key from the remote management server;
storing the master protection key;
generating a corresponding data protection key from the master protection key; and
decrypting the single encrypted data utilizing the corresponding data protection key to obtain the data,
wherein the communication device includes a Universal Integrated Circuit Card (UICC) and a secure device processor separate from and in communication with the UICC, and
wherein the UICC receives the master transport key and the master protection key over a network from the remote management server.

10. The device of claim 9, wherein the remote management server stores the master transport key and the master protection key to enable the upload transport key and the data protection key to be generated, and wherein the operations further comprise:
decrypting the double encrypted data utilizing the corresponding upload transport key to obtain the single encrypted data; and
storing the single encrypted data in a memory accessible to the processing system.

11. The device of claim 10, wherein the operations further comprise:
deleting the corresponding upload transport key after the decrypting of the double encrypted data.

12. The device of claim 9, wherein the corresponding upload transport key and the upload transport key are a same key.

13. The device of claim 9, wherein the operations further comprise:
deleting the corresponding data protection key after the decrypting of the single encrypted data.

14. The device of claim 9, wherein the UICC provides the upload transport key and the data protection key to the secure device processor without providing the master transport key and the master protection key to the secure device processor.

15. A machine-readable storage medium comprising executable instructions that, when executed by a processing system including a processor, facilitate performance of operations comprising:
receiving a master transport key from a remote management server;
generating a corresponding upload transport key from the master transport key; and
receiving double encrypted data from a communication device, wherein the double encrypted data is generated from data based on a data protection key that generates a single encrypted data and a second encryption of the single encrypted data according to an upload transport key;
receiving, by the processing system, a master protection key from the remote management server;
storing, by the processing system, the master protection key;
generating, by the processing system, a corresponding data protection key from the master protection key; and
decrypting, by the processing system, the single encrypted data utilizing the corresponding data protection key to obtain the data,
wherein the communication device includes Universal Integrated Circuit Card (UICC) and a secure device processor separate from and in communication with the UICC, wherein the UICC and the secure device processor perform a mutual authentication procedure utilizing a keyset received via the remote management server, and wherein the UICC receives the master transport key and the master protection key over a network from the remote management server.

16. The machine-readable storage medium of claim 15, wherein the remote management server stores the master transport key and the master protection key to enable the upload transport key and the data protection key to be generated, and wherein the operations further comprise:
decrypting the double encrypted data utilizing the corresponding upload transport key to obtain the single encrypted data; and
storing the single encrypted data in a memory accessible to the processing system.

17. The machine-readable storage medium of claim 16, wherein the operations further comprise:
deleting the corresponding upload transport key after the decrypting of the double encrypted data.

18. The machine-readable storage medium of claim 17, wherein the corresponding upload transport key and the upload transport key are a same key.

19. The machine-readable storage medium of claim 15, wherein the operations further comprise:
- deleting the corresponding data protection key after the decrypting of the single encrypted data.

20. The machine-readable storage medium of claim 15, wherein the UICC provides the upload transport key and the data protection key to the secure device processor without providing the master transport key and the master protection key to the secure device processor.

* * * * *